United States Patent
Son et al.

(10) Patent No.: US 9,498,769 B2
(45) Date of Patent: Nov. 22, 2016

(54) CATALYSTS FOR CARBON DIOXIDE REFORMING OF HYDROCARBONS

(71) Applicant: Samsung Electronics Co., Ltd., Suwon-Si, Gyeonggi-Do (KR)

(72) Inventors: In Hyuk Son, Yongin-si (KR); Seung Jae Lee, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/173,914

(22) Filed: Feb. 6, 2014

(65) Prior Publication Data

US 2014/0299816 A1 Oct. 9, 2014

(30) Foreign Application Priority Data

Apr. 9, 2013 (KR) .................. 10-2013-0038803

(51) Int. Cl.
| | | |
|---|---|---|
| *C01B 3/38* | (2006.01) | |
| *B01J 23/78* | (2006.01) | |
| *C01B 3/40* | (2006.01) | |
| *B01J 37/08* | (2006.01) | |
| *B01J 37/18* | (2006.01) | |
| *B01J 21/04* | (2006.01) | |
| *B01J 35/00* | (2006.01) | |
| *B01J 35/10* | (2006.01) | |

(52) U.S. Cl.
CPC .............. *B01J 23/78* (2013.01); *B01J 21/04* (2013.01); *B01J 35/002* (2013.01); *B01J 35/006* (2013.01); *B01J 35/0013* (2013.01); *B01J 35/1019* (2013.01); *B01J 37/08* (2013.01); *B01J 37/18* (2013.01); *C01B 3/40* (2013.01); *C01B 2203/0238* (2013.01); *C01B 2203/1047* (2013.01); *C01B 2203/1052* (2013.01); *C01B 2203/1058* (2013.01); *C01B 2203/1076* (2013.01); *C01B 2203/1082* (2013.01); *C01B 2203/1094* (2013.01); *C01B 2203/1241* (2013.01)

(58) Field of Classification Search
CPC ...................................................... B01J 23/78
USPC ......................................................... 252/373
See application file for complete search history.

(56) References Cited

U.S. PATENT DOCUMENTS 3,857,901 A * 12/1974 Dowden et al. ............... 585/477
4,663,103 A    5/1987 McCullough et al.

(Continued)

FOREIGN PATENT DOCUMENTS

| JP | 11-079705 | 3/1999 |
| JP | 2004-141860 A | 5/2004 |

(Continued)

OTHER PUBLICATIONS

Machine translation of JP 2006-035172 (2006).*

(Continued)

*Primary Examiner* — Paul Wartalowicz
(74) *Attorney, Agent, or Firm* — Harness, Dickey & Pierce, P.L.C.

(57) ABSTRACT

A catalyst for reforming hydrocarbons may include an inorganic oxide and a catalyst metal supported on the inorganic metal oxide. At least a portion of the catalyst metal may be supported in the form of a solid-solution particle. The catalyst metal may include a first metal (selected from cobalt, iron, copper, and manganese); nickel; and magnesium.

17 Claims, 8 Drawing Sheets

(56) References Cited

U.S. PATENT DOCUMENTS

| | | |
|---|---|---|
| 6,271,170 B1 | 8/2001 | Suh et al. |
| 6,355,219 B2 | 3/2002 | Suh et al. |
| 6,984,371 B2 | 1/2006 | Zhao et al. |
| 7,375,049 B2 | 5/2008 | Hayes et al. |
| 7,378,369 B2 | 5/2008 | Zhao et al. |
| 7,452,842 B2 | 11/2008 | Wakatsuki et al. |
| 7,824,656 B2 | 11/2010 | Idem et al. |
| 7,888,282 B2 | 2/2011 | Minami et al. |
| 7,906,559 B2 | 3/2011 | Olah et al. |
| 7,985,710 B2 | 7/2011 | Wang et al. |
| 8,133,926 B2 | 3/2012 | Olah et al. |
| 8,173,574 B2 | 5/2012 | Koermer et al. |
| 8,524,119 B2 | 9/2013 | Jun et al. |
| 8,614,161 B2 | 12/2013 | Lee et al. |
| 2001/0050354 A1 | 12/2001 | Suh et al. |
| 2003/0045423 A1 | 3/2003 | Dindi et al. |
| 2004/0067848 A1* | 4/2004 | Wakatsuki et al. .......... 502/328 |
| 2004/0077496 A1 | 4/2004 | Zhao et al. |
| 2004/0266612 A1 | 12/2004 | Hayes et al. |
| 2005/0058594 A1 | 3/2005 | Zhao et al. |
| 2005/0169835 A1 | 8/2005 | Savin-Poncet et al. |
| 2006/0093550 A1* | 5/2006 | Choudhary et al. .......... 423/651 |
| 2008/0069741 A1 | 3/2008 | Koermer et al. |
| 2008/0293989 A1* | 11/2008 | Khanmamedova et al. . 585/500 |
| 2008/0319093 A1 | 12/2008 | Olah et al. |
| 2009/0030240 A1 | 1/2009 | Olah et al. |
| 2010/0254892 A1* | 10/2010 | Takahashi et al. .......... 423/651 |
| 2011/0054045 A1 | 3/2011 | Olah et al. |
| 2011/0114892 A1 | 5/2011 | Jun et al. |
| 2012/0115965 A1 | 5/2012 | Olah et al. |
| 2012/0237432 A1 | 9/2012 | Son et al. |

FOREIGN PATENT DOCUMENTS

| | | |
|---|---|---|
| JP | 2006-035172 A | 2/2006 |
| JP | 2007-516924 A | 6/2007 |
| KR | 2000-0030023 A | 5/2000 |
| KR | 20020041346 A | 6/2002 |
| KR | 2003-0082762 A | 10/2003 |
| KR | 2004-0027888 A | 4/2004 |
| KR | 2009-0057127 A | 6/2009 |
| KR | 2010-0014012 A | 2/2010 |
| KR | 2010-0036254 A | 4/2010 |
| KR | 2012-0039173 A | 4/2012 |
| KR | 2012-0104722 A | 9/2012 |
| WO | WO-2005/092497 A1 | 10/2005 |

OTHER PUBLICATIONS

Jianguo Zhang, et al.; "Design and Preparation of Ni—Co Bimetallic Nanocatalyst for Carbon Dioxide Reforming of Methane", Nanocatalysis for Fuels and Chemicals, Chapter 12, pp. 195-221, Jan. 20, 2012.

Jianguo Zhang, et al. "Development of stable bimetallic catalusts for carbon dioxcide reforming of methane", Journal of Catalysis 249 (2007), pp. 300-310.

Jianguo Zhang, et al. "Effects of metal content on activity and stability of Ni—Co bimetallic catalysts for CO2 reforming of CH4", Applied Catalysis A: General 339 (2008) pp. 121-129.

Sang-Sik Lee, et al. "Partial Oxidation of Methane for Hydrogen Production over Co and Ni Catalysts", Korean Chem. Eng. Res., vol. 48, No. 6, Dec. 2010, pp. 776-783.

* cited by examiner

CATALYSTS FOR CARBON DIOXIDE REFORMING OF HYDROCARBONS

CROSS-REFERENCE TO RELATED APPLICATION

This application claims priority under 35 U.S.C. §119 to Korean Patent Application No. 10-2013-0038803, filed in the Korean Intellectual Property Office on Apr. 9, 2013, the entire contents of which are incorporated herein by reference.

BACKGROUND

1. Field

The present disclosure relates to a catalyst for $CO_2$ reforming of hydrocarbons, a method of manufacturing the same, and a hydrocarbon reforming process using the same.

2. Description of the Related Art

Hydrocarbons, such as natural gas and petroleum gas, may be reformed in the presence of a reforming material (e.g., carbon dioxide, water vapor, and oxygen) and a catalyst. For example, methane in natural gas may produce gases such as hydrogen and carbon monoxide via a carbon dioxide reforming (CDR) reaction represented by the following Reaction Schemes.

$$CH_4 + CO_2 \rightarrow 2CO + 2H_2 \quad [\Delta H_o = 247.3 \text{ kJ/mol}] \quad (1)$$

$$CO_2 + H_2 \rightarrow CO + 2H_2O \quad [\Delta H_o = 41 \text{ kJ/mol}] \quad (2)$$

Such reactions are endothermic and require a relatively high temperature such as at least 650° C. for a forward reaction to proceed. One of the major problems occurring in such reactions is catalyst degradation via catalyst coking, for example represented by the following reaction schemes.

$$CH_4 \leftrightarrow C + 2H_2 [\Delta H_o = 122.3 \text{ kJ/mol}] \quad (3)$$

$$2CO \leftrightarrow C + CO_2 [\Delta H_o = 125.2 \text{ kJ/mol}] \quad (4)$$

Reaction (3) represents $CH_4$ cracking, which is a primary cause for deactivation. Reaction (4), also known as a Boudouard reaction, does not really occur at a high temperature. Such reactions cause the generation of carbon, which is then deposited onto the catalyst, leading to a decrease in a reaction surface area, clogging of the pores in the catalyst, and acceleration of the support degradation. As a result, the catalyst eventually loses its activity. A sintering phenomenon is also one of major concerns that may cause a decrease in the number of active sites of the catalyst when it undergoes a relatively high temperature reaction. Due to the sintering phenomenon, a thermally unstable catalyst tends to aggregate to grow into a relatively large particle when it is subjected to a relatively high temperature reaction. The sintering phenomenon may result in a decrease in the number or the size of support pores, and a decrease in the interface area of a catalyst/support. Accordingly, the sintering may lead to a smaller area of the catalytically active surface and make it more difficult for the reaction gas to diffuse into the catalytically active site. Moreover, the sintering may cause a decreased interface between the catalyst and the support and thus may weaken the bonding strength therebetween. As a result, the conversion rate of the reaction gas becomes lower, the internal pressure of a reactor increases, and the durability of the catalyst/support is deteriorated.

SUMMARY

Some example embodiments relate to a catalyst for $CO_2$ reforming of hydrocarbons, thereby making it possible to reduce or avoid catalyst degradation by carbon deposition and to suppress sintering of the catalyst.

Some example embodiments relate to a method of manufacturing the catalyst.

Some example embodiments relate to a method of reforming hydrocarbons using the aforementioned catalyst.

A catalyst for $CO_2$ reforming of hydrocarbons may include an inorganic oxide and a catalyst metal supported on the inorganic metal oxide, wherein at least a portion of the catalyst metal is supported in the form of a solid-solution particle, and the catalyst metal includes at least one first metal (selected from cobalt, iron, copper, and manganese); nickel; and magnesium.

The solid-solution particle may have a plurality of particles (e.g., islands) including the inorganic oxide, the plurality of particles being supported on the surface of the solid-solution particle and being spaced apart from each other.

The solid-solution particle may have an average value of the longest diameter ranging from about 2 nm to about 20 nm.

The catalyst may include magnesium in an amount of about 0.01 wt % to about 5 wt %, based on the total weight of the catalyst.

The catalyst metal may be supported in an amount of about 1 wt % to about 15 wt % based on the total weight of the catalyst.

In the catalyst, a weight ratio between nickel and the first metal (Ni:first metal) may be about 1:20 to about 20:1.

The inorganic oxide may be at least one selected from an aluminum oxide, a titanium oxide, a cerium oxide, and a silicon oxide.

The inorganic oxide may have a specific surface area of about 20 m²/g to about 500 m²/g.

The catalyst may exhibit a change in average particle size of the catalyst metal less than about 50% when it contacts an input gas stream of $CH_4:CO_2:N_2=1:1:1$ at a temperature of about 700° C. to about 900° C. for up to about 200 hours.

The catalyst may have a carbon deposition rate less than about 0.1% when it contacts an input gas stream of $CH_4:CO_2:N_2=1:1:1$ at a temperature of about 700° C. to about 900° C. for up to about 200 hours.

A method of manufacturing a catalyst for $CO_2$ reforming of hydrocarbons may include providing an inorganic oxide; dissolving a water-soluble salt of at least one first metal (selected from cobalt, iron, copper, and manganese), a water-soluble salt of nickel, and a water-soluble salt of magnesium in water to provide an aqueous solution of metal salts; mixing the aqueous solution of metal salts with the inorganic oxide to obtain a homogeneous slurry mixture; drying the homogeneous slurry mixture to obtain a dried mixture; and calcining the dried mixture to obtain a catalyst. The catalyst may include magnesium in an amount of about 0.01 wt % to about 5 wt % based on a total weight of the catalyst, and the catalyst may include a solid solution particle including the first metal, nickel, and magnesium, the solid solution particle being supported on the inorganic oxide.

The catalyst may have a weight ratio between nickel and the first metal ranging from about 1:20 to about 20:1.

The catalyst may include a plurality of particles including the inorganic oxide, the particles being supported on the surface of the solid solution particle and being spaced apart from each other.

The calcination may be carried out in a nitrogen atmosphere, in a hydrogen atmosphere, or in the presence of a gas of $C_xH_yO_z$ (wherein x is an integer of 0 to 3, y is an integer of 0 to 3, and z is an integer of 0 to 3) at a temperature of about 400° C. to about 900° C.

The method may further include reducing the catalyst in a nitrogen atmosphere, in a hydrogen atmosphere, or in a nitrogen atmosphere and in a hydrogen atmosphere, wherein the reducing of the catalyst is carried out at a temperature of about 600° C. to about 900° C.

The method may further include adding water to the catalyst and heat-treating the catalyst in a hydrogen atmosphere, wherein the heat-treating of the catalyst may be carried out in the presence of hydrogen and water vapor at a temperature of about 500° C. to about 900° C.

The inorganic oxide may be at least one selected from an aluminum oxide, a titanium oxide, a cerium oxide, and a silicon oxide.

The water soluble salt may be at least one selected from an acetate salt, a nitrate salt, a sulfate salt, an oxalate salt, a halide, a chloride, and a hydrate thereof.

The first metal, nickel, and magnesium may be supported on the inorganic oxide in an amount of about 1 wt % to about 15 wt % based on a total amount of the catalyst.

According to another example embodiment, a method of reforming hydrocarbons may include bringing an input gas stream including a hydrocarbon and a reforming material into contact with a catalyst that includes an inorganic oxide and a catalyst metal supported on the inorganic metal oxide, wherein at least a portion of the catalyst metal is supported in the form of a solid-solution particle, and the catalyst metal includes at least one first metal (selected from cobalt, iron, copper, and manganese); nickel; and magnesium.

The solid-solution particle may include a plurality of particles including the inorganic oxide supported on the surface of the solid-solution particle and spaced apart from each other.

The catalyst may include magnesium in an amount of about 0.01 wt % to about 5 wt %, based on the total weight of the catalyst, and may have a weight ratio between nickel and the first metal ranging from about 1:20 to 20:1.

The inorganic oxide may be at least one selected from an aluminum oxide, a titanium oxide, a cerium oxide, and a silicon oxide.

The input gas stream may further include water.

The input gas stream may further include an inert gas selected from nitrogen, helium, argon, and a combination thereof.

The contacting may be carried out at a reaction temperature of about 500° C. to about 1000° C. under a gas pressure of about 0.5 atm to 50 atm.

When it is used in a reforming reaction of hydrocarbons even at a relatively high temperature, the catalyst is less likely to undergo sintering, the amount of deposited carbon is relatively small, and the catalyst may exhibit increased reaction efficiency.

DETAILED DESCRIPTION

Figure 1:
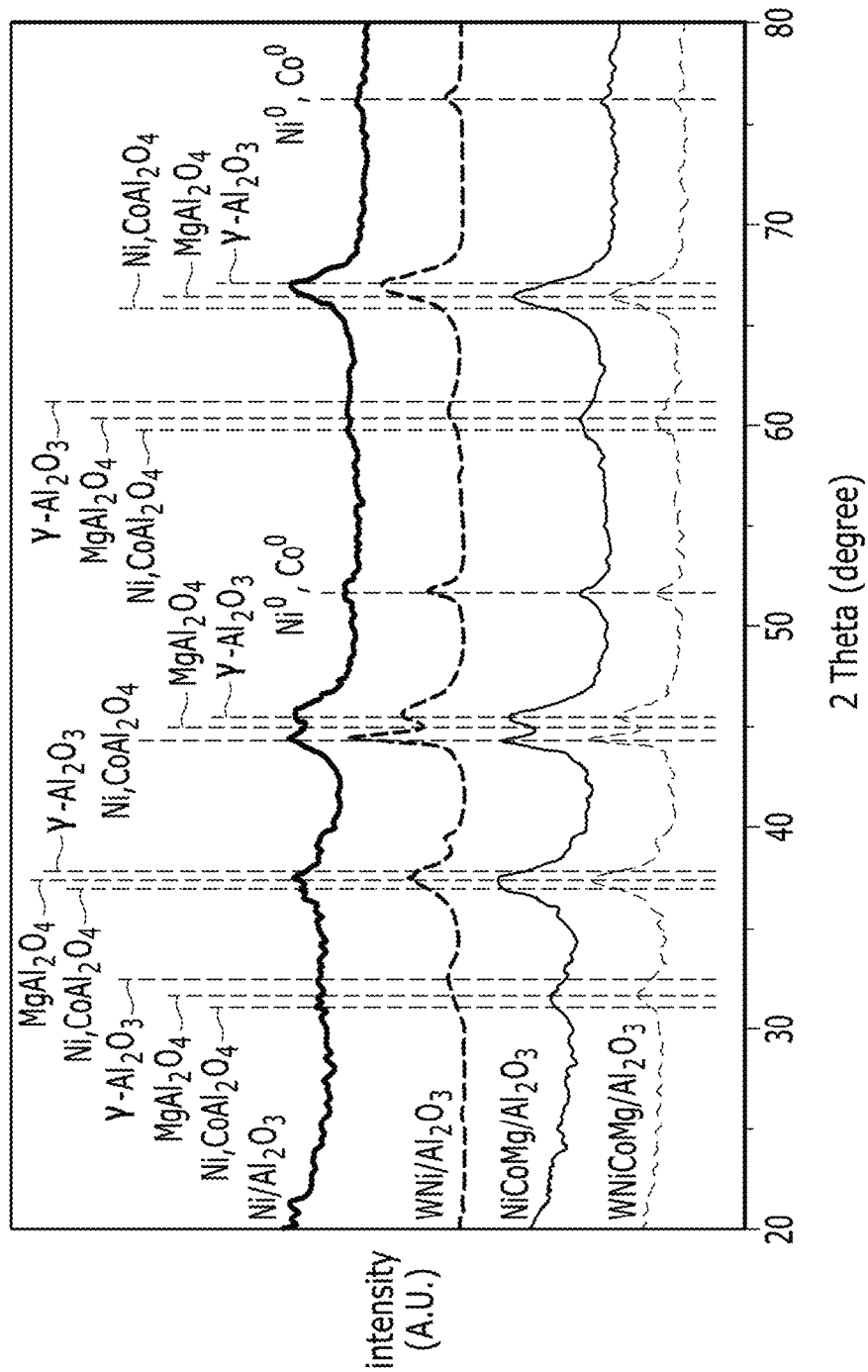
FIG. 1 shows an X-ray diffraction (XRD) spectrum for the catalysts obtained from Examples 1 and 2 and Comparative Examples 1 and 2.

The advantages and characteristics of the present disclosure, and the method of achieving them, will be clearly understood in view of the accompanying drawings and example embodiments. However, the present disclosure is not limited to the following example embodiments and may be realized with different embodiments. The example embodiments are merely provided to complete the disclosure of the present application and aid the understanding of a person of ordinary skill in the art to fully understand the scope of the claims, and the present disclosure is defined only by the claims. Thus, in some example embodiments, well-known technologies are not specifically explained to avoid obscuring a reader's understanding of the present disclosure. Unless otherwise defined, all terms used in the specification (including technical and scientific terms) may be used as meanings commonly understood to a person having ordinary knowledge in the art. Further, unless explicitly defined otherwise, the terms defined in a generally-used dictionary are not ideally or excessively interpreted. In addition, unless explicitly described to the contrary, the word "include" and variations such as "includes" or "including" will be understood to imply the inclusion of stated elements but not the exclusion of any other elements throughout the specification.

Unless particularly described to the contrary, a singular form includes a plural form.

The example embodiments of the present disclosure described in the specification are explained with reference to idealized drawings or schematic diagrams. Therefore, the parts illustrated in the drawings have outline properties and they are not to limit the categories of the present disclosure. The same reference numerals designate the same constituent elements throughout the specification.

The term "input gas stream" refers to a gas stream prior to passing through a catalyst region or prior to initial contact with a catalyst composition.

A catalyst for reforming hydrocarbons may include an inorganic oxide and a catalyst metal supported on the inorganic metal oxide, wherein at least a portion of the catalyst metal is supported in the form of a solid-solution particle, and the catalyst metal includes at least one first metal (selected from cobalt, iron, copper, and manganese); nickel; and magnesium.

In the catalyst, the catalyst metal including the first metal (e.g., cobalt and the like), nickel, and magnesium is supported on the inorganic oxide support in the form of a solid-solution particle. The catalyst metal is structurally stable as it is present in the form of a solid-solution particle. Without wishing to be bound by any theory, magnesium included in the catalyst metal particle may increase the basicity of the catalyst metal so that a carbon dioxide gas (which is an acidic gas) may be readily adsorbed onto the catalyst metal particle, making it possible to enhance the efficiency of the reforming reaction, suppressing side reactions, and thereby the deposited amount of carbon may decrease and the disassociation rate of the reforming reaction product may increase. In addition, without wishing to be bound by any theory, inclusion of the first metal and magnesium in the catalyst allows the formation of a spinel-like structure and the strong interaction between the metal and the support. Therefore, the catalyst may exhibit such a high level of thermal stability that the catalyst metal may avoid the sintering phenomenon and the durability of the catalyst may be enhanced.

The presence of the solid-solution particle of the catalyst metal may be confirmed by an X-ray diffraction spectroscopy analysis and an energy dispersive X-ray spectroscopy analysis. XRD spectrums of the catalyst thus obtained allow confirmation of the formation of the solid solution particle. By way of an example, the peaks for the magnesium-support oxide are identified at a position near the peaks for the support oxide—the alloy of the first metal and the nickel metal (e.g., a NiCo alloy-support oxide).

The EDX analysis of the catalyst may also confirm that the first metal, nickel, and magnesium are uniformly distributed in the catalyst metal particle supported on the support. The solid solution particle may have an average maximum diameter of about 2 nm to about 20 nm, but it is not limited thereto. The catalyst may exhibit a high level of reaction efficiency due to the inclusion of the magnesium component in the solid particle. In particular (as will be described below), when the solid solution particle has islands of the support oxide on its surface, the number of carbon-growth sites may decrease, while the interface area between the metal and support may increase. Therefore, even when the particle of the catalyst metal has a relatively large size, the catalyst may exhibit a high level of reaction efficiency and the amount of carbon deposited thereon may be maintained at a relatively low level.

The catalyst may include magnesium in an amount of about 0.01 wt % to about 5 wt %, based on the total weight thereof. The catalyst metal may be supported on the support in an amount of about 1 to about 15 wt %, for example, about 2 to about 14 wt %, or about 3 to about 13 wt %, or about 4 to about 13 wt %, or about 5 to about 10 wt % based on the total weight of the catalyst (including the support). In the catalyst, the weight ratio between nickel and the first metal may range from about 1:20 to 20:1 (i.e., the amount of the first metal being about 0.05 g to about 20 g per 1 g of nickel), for example from about 1:10 to 10:1 (i.e., the amount of the first metal being about 0.1 g to about 10 g per 1 g of nickel), or from about 1:5 to 5:1 (i.e., the amount of the first metal being about 0.2 g to about 5 g per 1 g of nickel), or from about 1:3 to 3:1.

The solid solution particle may include a support island [i.e., plurality of particles including the inorganic oxide (for example, being supported thereon), which are spaced each other and supported on the surface of the solid solution particle]. That is, the inorganic oxide (i.e., the support) may also exist on the surface of the solid-solution particle in the form of an island. Without wishing to be bound by any theory, such a support island on the surface of the solid solution particle thus formed may result in an increase in the metal-support interface site, leading to more sites and higher efficiency for the reforming reaction. In addition, the area of sites susceptible to the carbon deposition or the carbon growth decreases so that the number of the nickel metal particles having a size over 10 nm (i.e., that may cause a significant level of sintering) decreases and thereby the durability of the catalyst may be further enhanced.

Such a structure may be obtained by subjecting the calcined and optionally reduced catalyst to a heat-treatment in the presence of water under the conditions described below (hereinafter referred to as "water pre-treatment"). Detailed description for the water pre-treatment will be given below in relation to the method of producing the catalyst.

Types of the inorganic oxide support may include, but are not limited to, an aluminum oxide, a titanium oxide, a cerium oxide, and a silicon oxide. The inorganic oxide support may be used alone or in a mixture of at least two compounds. The inorganic oxide may have a specific surface area of about 20 to 500 $m^2/g$, for example about 100 to 500 $m^2/g$, but it is not limited thereto.

Therefore, the catalyst for carbon dioxide reforming of hydrocarbons may exhibit a higher level of efficiency, and even after the relatively high temperature reaction, it may control the growth rate of the particle size or the amount of carbon deposition so as to keep it at a relatively low level. For example, when it contacts an input gas stream of $CH_4:CO_2:N_2=1:1:1$ at a temperature of about 700° C. to about 900° C. for up to about 200 hours, the catalyst may exhibit a change in the average particle size of the catalyst metal of less than about 50%, for example, less than about 49%, less than about 48%, less than about 47%, less than about 46%, or less than about 20%. In addition, when it contacts an input gas stream of $CH_4:CO_2:N_2=1:1:1$ at a temperature of about 700° C. to about 900° C. for up to about 200 hours, the catalyst for reforming hydrocarbons may have a carbon deposition rate of less than about 0.1 wt %, for example, less than about 0.06%.

In another example embodiment, a method of manufacturing a catalyst for $CO_2$ reforming of hydrocarbons may include providing an inorganic oxide; dissolving a water-soluble salt of at least one first metal selected from cobalt, iron, copper, and manganese, a water-soluble salt of nickel, and a water-soluble salt of magnesium in water to provide an aqueous solution of metal salts; mixing the aqueous solution of metal salts with the inorganic oxide to obtain a homogeneous slurry mixture; drying the homogeneous slurry mixture to obtain a dried mixture; and calcining the dried mixture to obtain a catalyst, wherein the catalyst may include magnesium in an amount of about 0.01 wt % to about 5 wt %, based on the total weight of the catalyst, and the catalyst may include a solid solution particle including the first metal, nickel, and magnesium, the solid solution particle being supported on the inorganic oxide.

The catalyst may include a plurality of particles including the inorganic oxide, the plurality of particles being supported on the surface of the solid solution particle and being spaced apart from each other.

The catalyst may have a weight ratio between nickel and the first metal ranging from about 1:20 to about 20:1.

Details for the catalyst, the support islands, and the inorganic oxide are the same as set forth above. The inorganic oxide may be prepared using any known methods, and it is possible to use a commercially available one.

In the preparation of the aqueous solution of the water soluble salts of the catalyst metal, the amounts of the water soluble salt of the first metal, the amount of the water soluble salt of nickel, and the amount of the water soluble salt of magnesium may be controlled so that the resulting catalyst may have a desired amount of each metal component being supported thereon. The types of the water soluble salt may include, but are not limited to, an acetate salt, a nitrate salt, a sulfate salt, an oxalate salt, a halide, a chloride, and a hydrate thereof.

The aqueous solution of the metal salt is mixed with the inorganic oxide to prepare a homogeneous slurry mixture. The homogeneous slurry mixture may be obtained by controlling the amount of the inorganic oxide and the amount of the aqueous solution of the metal salts. The amount of the aqueous solution of the metal salts may vary with the inorganic oxide, e.g., its type, its specific surface area, its pore volume, and the like, and may be determined with ease. For example, the amount of the aqueous solution of the metal salts may be substantially the same as the pore volume of the inorganic oxide, and when the hydrate of the metal salt is used, the amount of the water being included as a hydrate is taken into account for determining the amount of the aqueous solution of the metal salts. As used herein, the "homogeneous slurry" refers to a homogeneous mixture being formed without any noticeable separation of a water phase and a solid phase. In a non-limiting example, preparing the homogeneous slurry may include co-impregnating the inorganic oxide (support) with the aqueous solution of the metal salt via incipient wetness impregnation.

In a non-limiting example, in the homogeneous slurry mixture, the inorganic oxide support may be co-impregnated with the aqueous solution of the metal salts via the incipient wetness impregnation. If desired, the homogeneous slurry thus obtained may be stirred at a temperature ranging from an ambient temperature to about 50° C. for about 60 minutes to about 24 hours. The homogeneous slurry mixture (e.g., the inorganic oxide slurry co-impregnated with the aqueous solution of metal salts) may be dried. The conditions for the drying are not particularly limited, but they may be properly chosen. In a non-limiting example, the drying may be carried out under an inert gas (e.g., nitrogen) atmosphere at a temperature of 100° C. or higher.

The dried slurry mixture is calcinated to produce the catalyst. The catalyst includes a solid-solution particle of the first metal, nickel, and magnesium, which is supported on the inorganic oxide. Details of the catalyst are the same as set forth above. The calcination may be carried out under a nitrogen atmosphere, a hydrogen atmosphere, and/or in the presence of a gas represented by $C_xH_yO_z$ (wherein x is an integer of 0 to 3, y is an integer of 0 to 3, and z is an integer of 0 to 3) at a temperature of about 450° C. to 900° C. The gas represented by $C_xH_yO_z$ may be, for example, air, oxygen, carbon dioxide, CO, $H_2$, or a mixture thereof. The calcination time is not particularly limited, but it may be, for example, greater than or equal to about 10 minutes, or greater than or equal to about one hour.

The catalyst being calcined may be further subjected to a reducing process under a nitrogen atmosphere and/or under a hydrogen atmosphere. The reducing process may be carried out at a temperature of about 600° C. to about 900° C. The reducing time is not particularly limited, but may be properly chosen.

The method may further include adding water to the calcined and optionally reduced catalyst and heat-treating the catalyst under a hydrogen atmosphere (i.e., subjecting the catalyst to the water pretreatment). The amount of water is not particularly limited but may be properly adjusted. In non-limiting examples, water is used in such an amount that it may impregnate the catalyst. The heat-treating may be carried out in the presence of hydrogen and water vapor at a temperature of about 500° C. to 900° C. When water is added to the catalyst and the resulting catalyst is heat-treated under a hydrogen atmosphere, water being added is evaporated and the heat-treating may be conducted in the presence of hydrogen and water vapors. Such a water pretreatment makes it possible for the solid-solution particle to have the inorganic oxide (i.e., the support oxide) islands being spaced from each other and supported on the surface of the solid solution particle. Details for the structure regarding the inorganic oxide (i.e., the support oxide) islands are the same as set forth above. The water pre-treatment may cause an increase in the average particle size, but the resulting catalyst may exhibit a decreased change rate (i.e., growth rate) of the particle size after the carbon dioxide reforming reaction.

According to another example embodiment, a method of $CO_2$ reforming of hydrocarbons may include bringing an input gas stream (including hydrocarbons and carbon dioxide) into contact with a catalyst, the catalyst including an inorganic oxide and a catalyst metal supported on the inorganic metal oxide, wherein at least a portion of the catalyst metal is supported in the form of a solid-solution particle, and the catalyst metal includes at least one first metal (selected from cobalt, iron, copper, and manganese); nickel; and magnesium.

Details for the catalyst are the same as set forth above.

The sources of hydrocarbons included in the input gas stream are not particularly limited, but may include fossil fuels such as natural gas, petroleum gas, naphtha, heavy oil, crude oil, coal, or the like; and a non-fossil fuel such as mixed biomass including crude ethanol, wood waste, and agricultural waste residue; municipal solid waste, pulp sludge, and grass straw. For example, the hydrocarbon comprises methane.

In the input gas stream, the ratio of hydrocarbon and reforming material may be adjusted in light of a $H_2/CO$ ratio, a $CH_4$ conversion rate, a $CO_2$ conversion rate, a yield, or the like, but it is not particularly limited. For example, the ratio of the hydrocarbon and the reforming material may range from about 1:1 to about 1:3, based on the mole ratio. The input gas stream may further include a dilution inert gas such as nitrogen or the like in addition to the hydrocarbons and reforming materials. The input gas stream may further include water.

The contact conditions between the input gas stream and the catalyst for reforming hydrocarbons are not particularly limited as long as a gas including hydrogen is produced by the reforming reaction triggered by the contact. For example, the contact may be performed at a temperature of about 500 to about 1100° C., and specifically at about 600 to about 1000° C., under a pressure of about 0.5 to about 50 atm, and more specifically about 1 to about 20 atm. In addition, the gas hourly space velocity (GHSV) of the input gas stream is not particularly limited, and may be properly selected in light of a $CH_4$ conversion rate and a $CO_2$ conversion rate. For example, the space velocity (GHSV) of the input gas stream may range from about 500 to 400,000 $h^{-1}$, and more specifically from about 1000 to 380,000 $h^{-1}$.

As described above, when the catalyst for $CO_2$-reforming hydrocarbons having the aforementioned structure is used for the reforming reaction, the reaction efficiency and the stability of the catalyst may be enhanced so that the agglomeration of the catalyst particles (e.g., a sintering phenomenon) may be significantly suppressed and the amount of the deposited carbon may also be greatly reduced.

Hereinafter, the embodiments are illustrated in more detail with reference to examples. However, the following are example embodiments and are not limiting.

EXAMPLE

Preparation of a Catalyst

Example 1

Preparation of a Catalyst Including NiCoMg Solid Solution Particles Supported onto $Al_2O_3$ $Ni(NO_3)_2\text{-}6H_2O$, $Mg(NO_3)_2\text{-}6H_2O$, and $Co(NO_3)_2\text{-}6H_2O$ are put into 5 ml of deionized water while stirring and completely dissolved therein to produce an aqueous solution of the metal salts. Using the aqueous solution of the metal salts and via the incipient wetness impregnation method, 10 g of gamma alumina (from Aldrich, specific surface area: 150 $m^2/g$, granule diameter: about 3 mmϕ, pore volume: 3 to 5 $(cm^3/g)m$) is co-impregnated with $Ni(NO_3)_2\text{-}6H_2O$, $Mg(NO_3)_2\text{-}6H_2O$, and $Co(NO_3)_2\text{-}6H_2O$. The obtained product is dried in an oven at 120° C. for 24 hours, and calcined in air (300 ml/minute) at 500° C. for 5 hours. The calcined product (i.e., the catalyst) is subjected to a reducing process in a pure $H_2$ atmosphere by increasing a temperature at a rate of 10° C./min and maintaining the temperature at 850° C. for 2 hours to prepare a catalyst including NiCoMg solid solution particles supported on the alumina support ($NiCoMg/Al_2O_3$). The amount of Ni, the amount of Co, and the amount of Mg are 3 wt %, 3 wt %, and 3 wt %, respectively, based on the total weight of the catalyst.

Example 2

Preparation of a Catalyst Including NiCoMg Solid Solution Particles with $Al_2O_3$ Islands Formed Thereon (the Water-Pretreated Catalyst)

The temperature of the reactor having the catalyst obtained in accordance with Example 1 is decreased to 30° C., and 5 ml of water is added thereto. Then, the reactor is heated at a rate of 10° C./min to evaporate water in a hydrogen atmosphere, and the catalyst contained therein is heat-treated at 850° C. for one hour to prepare a catalyst wherein the NiCoMg solid solution particle is supported on the alumina support and the solid solution particle includes alumina islands on its surface (hereinafter referred to as $WNiCoMg/Al_2O_3$). The amount of Ni, the amount of Co, and the amount of Mg are 3 wt %, 3 wt %, and 3 wt %, respectively, based on the total weight of the catalyst.

Comparative Example 1

Preparation of a Catalyst Including Ni Particles Supported on $Al_2O_3$

A catalyst including Ni particles supported on $Al_2O_3$ is prepared in the same manner as set forth in Example 1, except for using an aqueous solution of $Ni(NO_3)_2\text{-}6H_2O$ instead of the aqueous solution of $Ni(NO_3)_2\text{-}6H_2O$, $Mg(NO_3)_2\text{-}6H_2O$, and $Co(NO_3)_2\text{-}6H_2O$. The amount of Ni is 3 wt %, based on the total weight of the catalyst.

Comparative Example 2

Preparation of a Catalyst Including Ni Particles with $Al_2O_3$ Islands Formed Thereon With using the catalyst obtained from Example 1, a water-pretreated catalyst (hereinafter, $WNi/Al_2O_3$) is prepared by conducting a water pretreatment in the same manner as set forth in Example 2. The amount of Ni is 3 wt %, based on the total weight of the catalyst.

Comparative Example 3

A catalyst is prepared in the same manner as set forth in Example 1, except that $Mg(NO_3)_2\text{-}6H_2O$ is used in such an amount that the amount of Mg is 6% in the resulting catalyst. The amount of Ni, the amount of Co, and the amount of Mg are 3 wt %, 3 wt %, and 6 wt %, respectively, based on the total weight of the catalyst. In this example, a XRD spectrum analysis and a SEM/TEM/EDX analysis confirm that in the catalyst particle, nickel, cobalt and magnesium are not present in the same catalyst metal particle and thus no solid-solution particle is formed.

Characterization of the Catalysts

Experimental Example 1

Measurement of BET Surface Area of the Catalyst Prior to and after the Reforming Reaction BET surface areas of the catalysts prepared in Examples 1 and 2 are measured using a nitrogen adsorption technology at −196° C. with BELsorp (BEL, Japan) before and after the catalysts are subjected to the reforming reaction. The results are summarized in Table 1. The average particle sizes of the catalyst metal are measured using XRD, TEM, and $H_2$ chemisorption, and the results are compiled in Table 1. Prior to the adsorption measurement, the samples are degassed at a temperature of 200° C. for 24 hours. The CO2 reforming reaction is carried out under the following conditions.

T=850° C., $CH_4:CO_2:N_2$=1.0:1.0:1.0, 200 hr, GHSV=10 k $h^{-1}$

TABLE 1

| Catalyst | BET surface area ($m^2/g$) | Average particle size (nm) |
|---|---|---|
| Fresh $NiCoMg/Al_2O_3$ | 167.30 | 11 |
| Used $NiCoMg/Al_2O_3$ | 101.77 | 15 |
| Fresh $WNiCoMg/Al_2O_3$ | 111.76 | 14 |
| Used $WNiCoMg/Al_2O_3$ | 98.62 | 16 |

The results of Table 1 confirm that the catalyst of Example 1 exhibits a relatively small change in the BET surface area (39.2%) and an average particle size prior to and after the reaction. In addition, the catalyst of Example 2 shows a very small change in the BET surface area (i.e., only 11.76%), which is about 3.33 times smaller than the catalyst of Example 1, and the catalyst of Example 2 shows a very small change in the average particle size.

Experimental Example 2

XRD Analysis of the Catalyst

A powder X-ray diffraction (XRD) analysis is made for the catalysts obtained from Examples 1 and 2 and Comparative Examples 1 and 2. For the analysis, a Philips Xpert Pro X-ray diffractometer equipped with Cu—Kα radioactive ray is used at 40 KV and 40 mA. The results are shown in FIG. 1. As shown in FIG. 1, the peaks for $MgAl_2O_4$ are identified at a 2 theta of 32 degrees and 60.5 degrees, respectively. A small shift of the peaks is identified due to the formation of a nickel-cobalt alloy. Such results hint that a solid-solution particle of Ni, Co, and Mg is formed in the catalyst of Examples 1 and 2.

Experimental Example 3

$CO_2$ Temperature Programmed Desorption (TPD) Analysis for the Catalyst

A temperature programmed desorption (TPD) analysis is made for the catalysts of Examples 1 and 2 and Comparative Examples 1 and 2 using a Chemisorption Analyzer (BEL-CAT) apparatus. The results are shown in FIG. 2.

Figure 2:
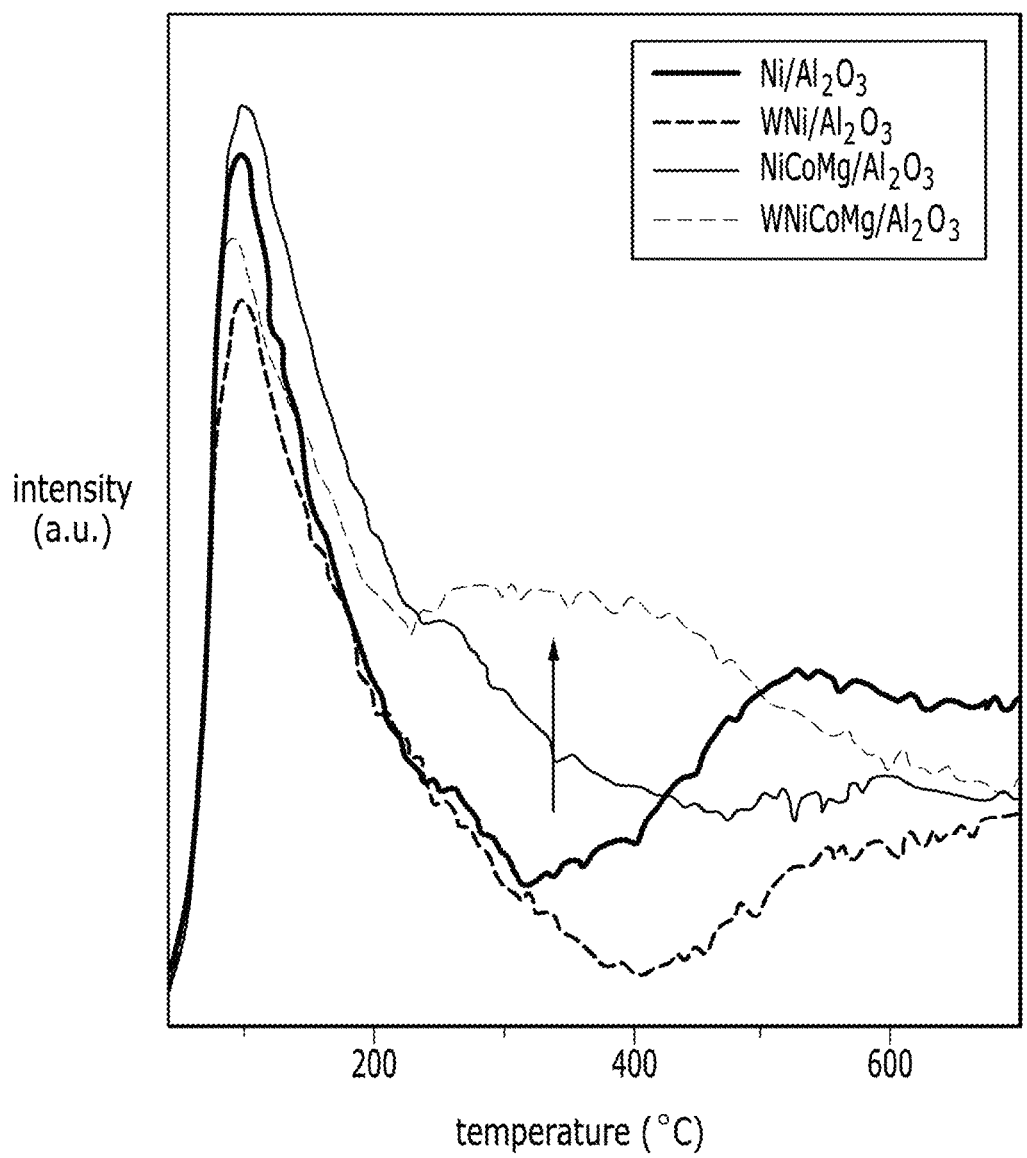
FIG. 2 is a graph showing the results of temperature programmed desorption (TPD) tests carried out in Experimental Example 2 for the catalysts obtained from Examples 1 and 2 and Comparative Examples 1 and 2.

FIG. 2 shows that at 300° C., the catalysts of Examples 1 and 2 have a $CO_2$ desorption amount that is significantly greater than that of the catalyst of Example 2. Such results confirm that a greater amount of carbon dioxide may be adsorbed to the catalysts of Examples 1 and 2 than those of the comparative examples, and thereby, the catalysts of Examples 1 and 2 may exhibit a far higher rate of methane decomposition than those of the comparative examples.

Experimental Example 4

Measurement of a DRIFT Spectrum

A diffuse reflectance infrared Fourier transform (DRIFT) spectroscopy analysis is made for the catalysts of Examples 1 and 2 and the catalysts of the comparative examples using a Nicolet 5700 FTIR spectrometer equipped with an MCT detector. The results are shown in FIG. 3.

Figure 3:
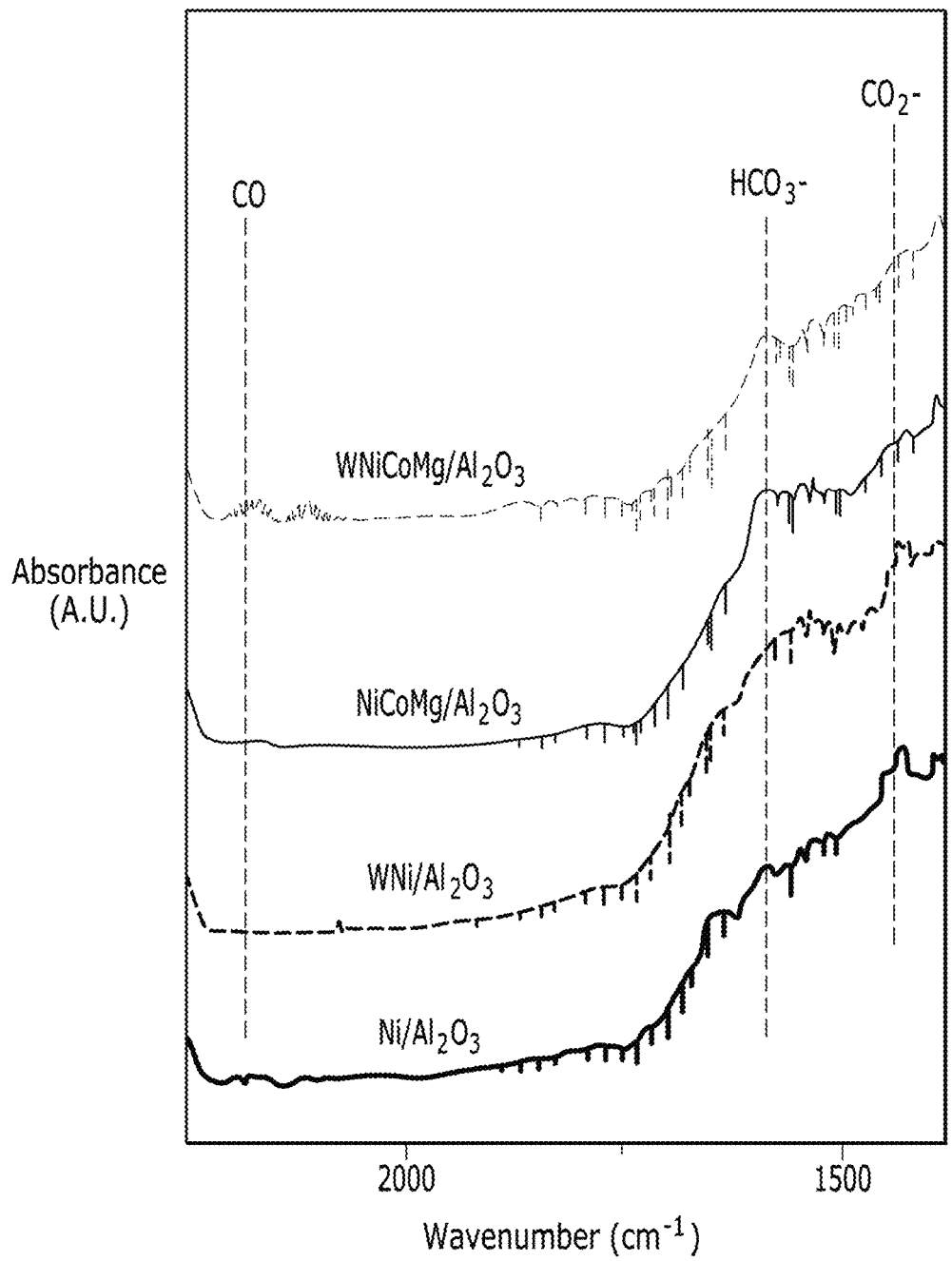
FIG. 3 is a graph showing the results of DRIFT spectroscopy analysis carried out in Experimental Example 3 for the catalysts obtained from Examples 1 and 2 and Comparative Examples 1 and 2.

As shown in FIG. 3, the catalysts of Examples 1 and 2 have a peak for $HCO_3^{-1}$ and a peak for CO which are much higher than those of the catalyst of the comparative examples, and a peak for $CO_2$—, which is lower than those of the catalyst of the comparative examples. Such results confirm that the catalysts of the examples exhibit higher efficiency of decomposing $CO_2$ and methane than those of the comparative examples.

Experimental Example 5

Scanning Electron Microscopy (SEM) Analysis, Transmission Electron Microscopy (TEM) Analysis, and Energy Dispersive X-Ray Spectroscopy (EDX) Analysis The SEM analysis, the TEM analysis, and the EDX analysis are conducted for the catalysts of Examples 1 and 2 using UHR-FE-SEM (Hitachi S-5500, resolution 0.4 nm). The results are shown in FIG. 4 and FIG. 5.

Figure 4:
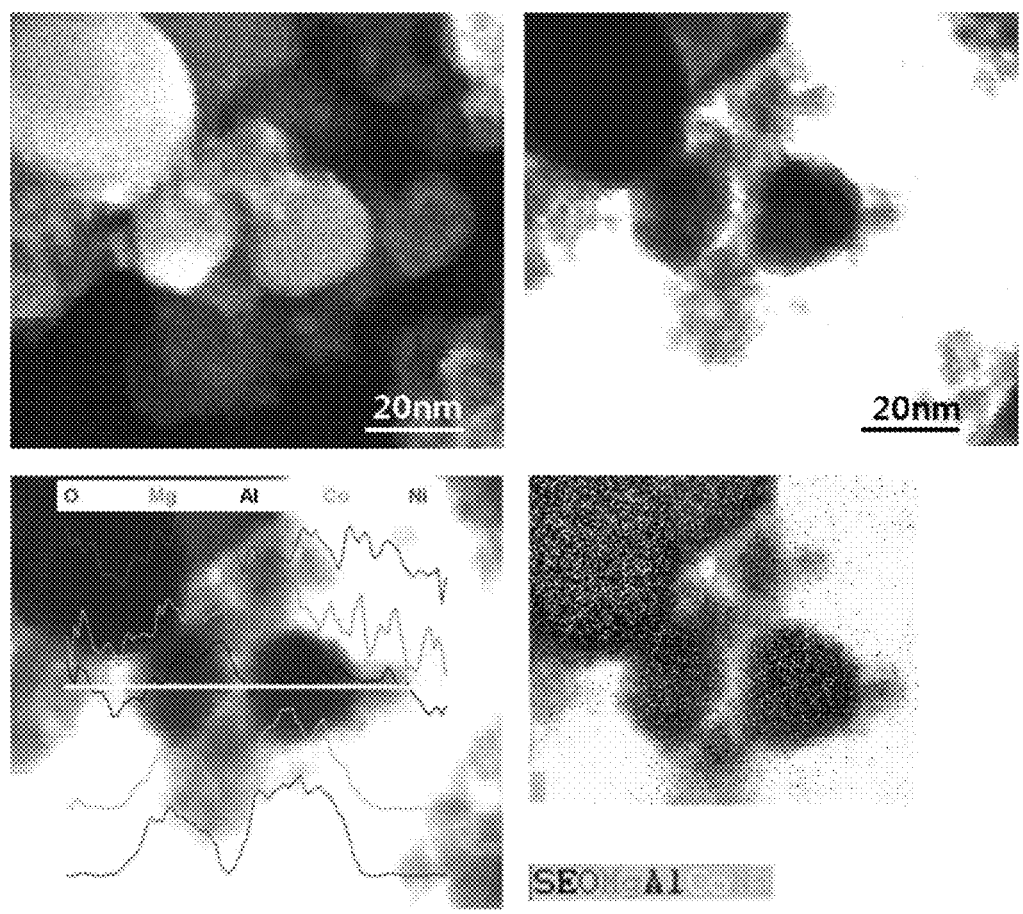
FIG. 4 is a view illustrating a SEM image, a TEM image, and EDX results for the catalyst of Example 1.
Figure 5:
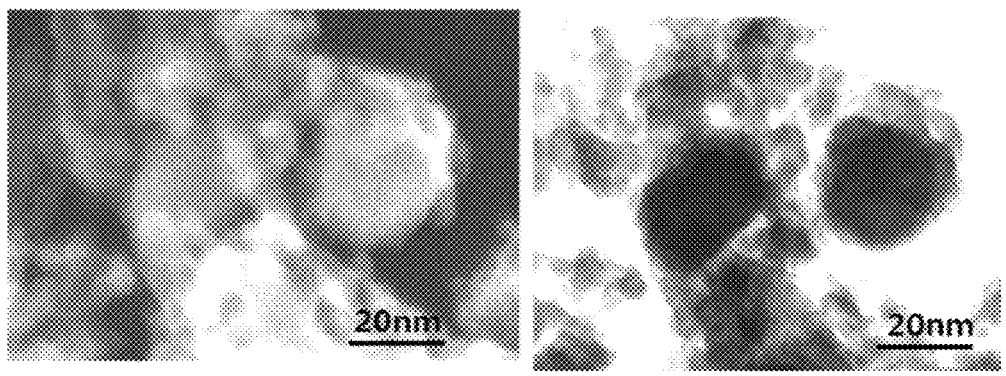
FIG. 5 is a view illustrating a SEM image, a TEM image, and EDX results for the catalyst of Example 2.
Figure 5:
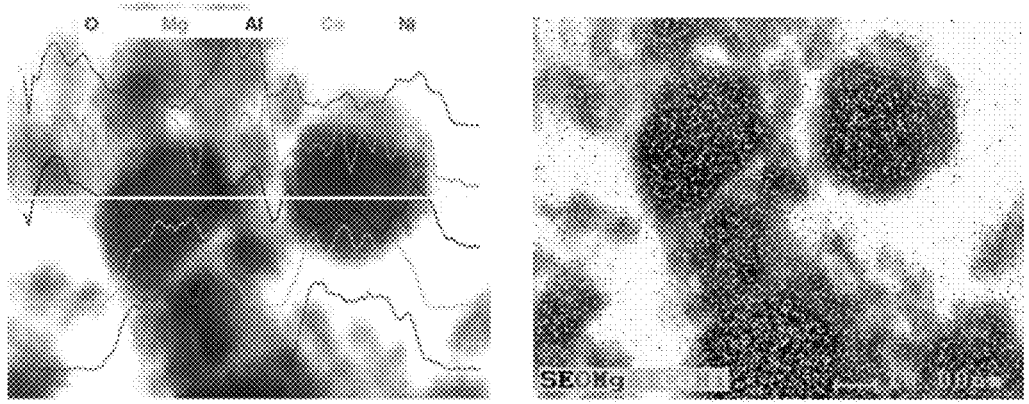

FIG. 4 confirms that in the catalyst of Example 1, the NiCoMg catalyst metals, form a solid solution particle. FIG. 5 confirms that in the catalyst of Example 2, the WNiCoMg catalyst metals, form a solid solution particle, and the support oxide ($Al_2O_3$) islands are present on the surface of the solid solution particle.

Analysis for Catalytic Activity: $CO_2$ Reforming Reaction of Methane

Experimental Example 6

Evaluation of Long-Term Efficiency

Figure 6:
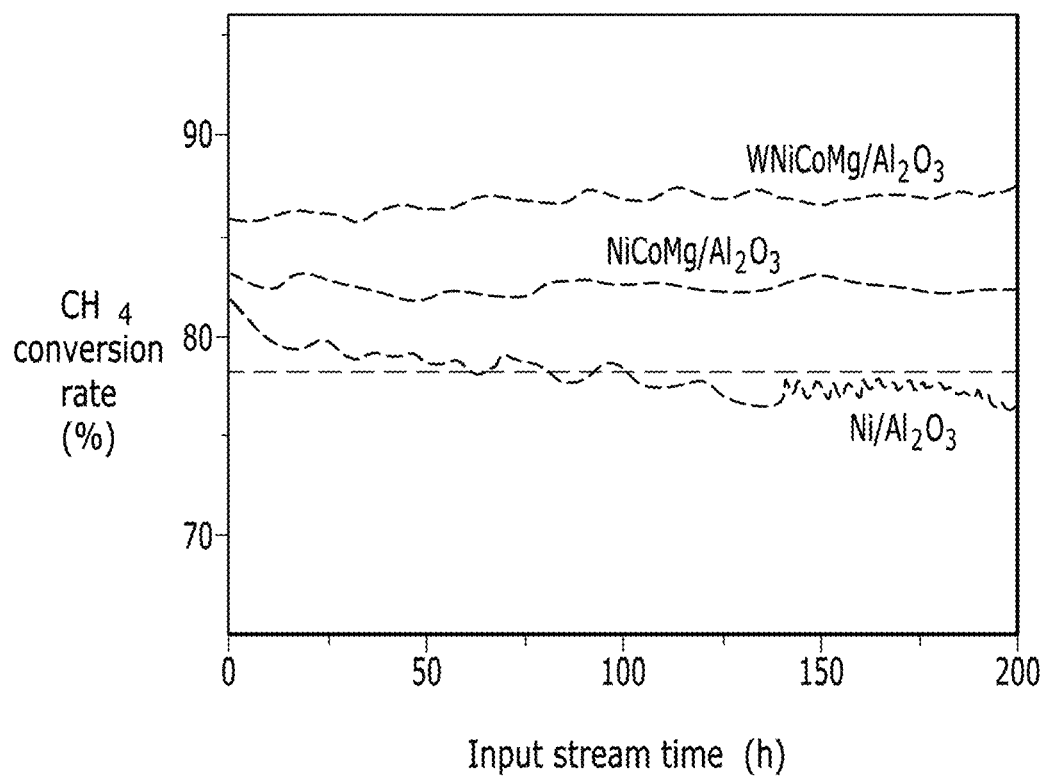
FIG. 6 shows curves plotting a methane conversion rate over time for the catalysts of Examples 1 and 2 and Comparative Example 1.

Using each catalyst obtained from Examples 1 and 2 and Comparative Examples 1 and 2, the carbon dioxide reforming reaction of methane is conducted, and the $CH_4$ conversion rates over time are shown in FIG. 6. The conditions for $CO_2$ reforming reaction are as follows.

Temperature=850° C., $CH_4$:$CO_2$:$N_2$=1.0:1.0:1.0, 200 hr, GHSV=10,000 $h^{-1}$ As shown in FIG. 6, the catalysts of Example 1 and 2 have higher initial methane conversion efficiency than Comparative Examples 1 and 2, and their long-term efficiency is much higher than the comparative examples.

Experimental Example 7

Evaluation of Carbon Deposition

Figure 7:
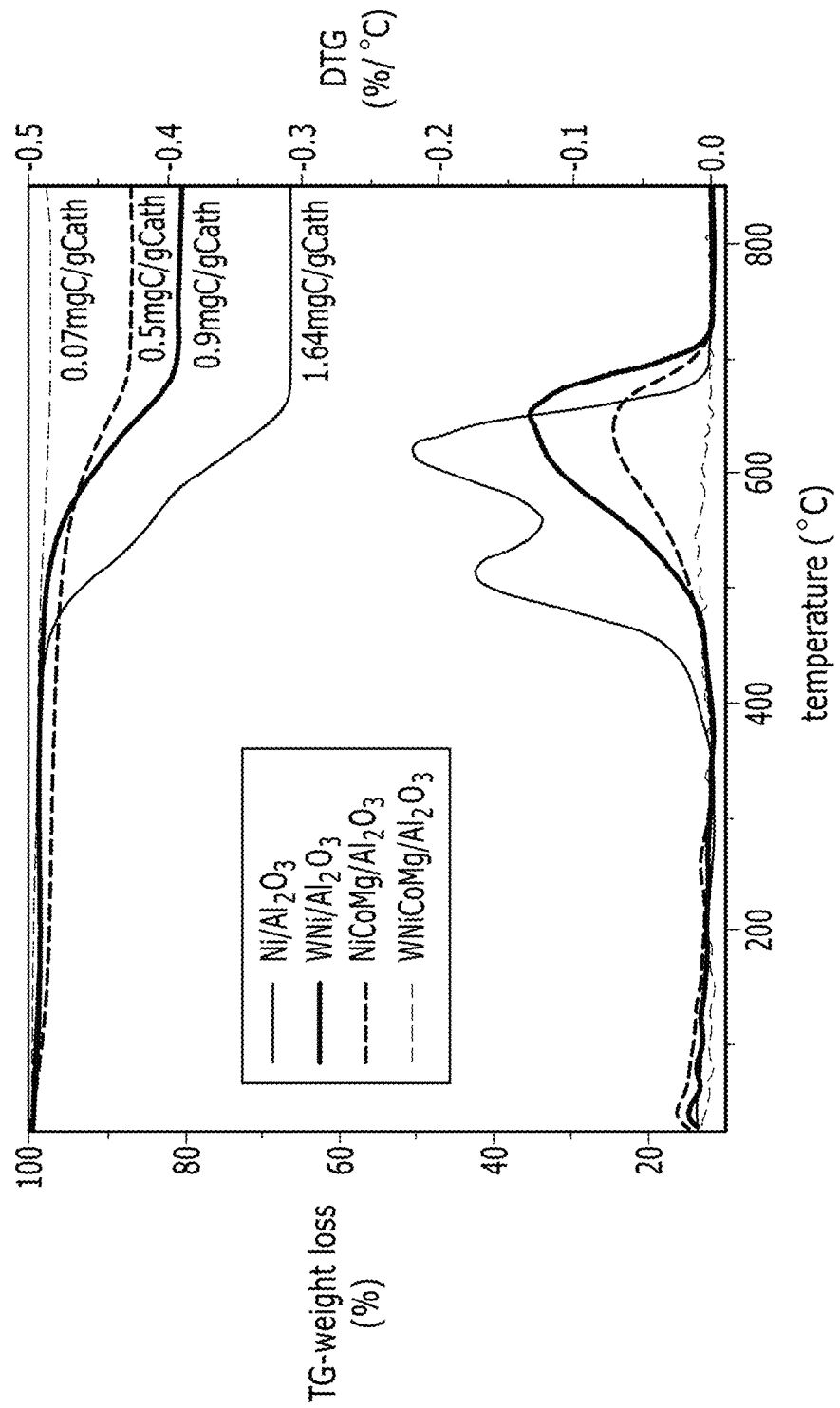
FIG. 7 shows the results of a thermogravimetric analysis for each of the catalysts of Examples 1 and 2 and Comparative Examples 1 and 2 after being used in carbon dioxide reforming of methane.

Using each catalyst obtained from Examples 1 and 2 and Comparative Examples 1 and 2, the carbon dioxide reforming reaction of methane is conducted under the same conditions as Experimental Example 6. After the reaction, each of the catalysts is subjected to a thermal gravimetric analysis using METTLER TOLEDO TGA/DSC1, from which the carbon-deposited amount is calculated. The results are shown in FIG. 7. The results of FIG. 7 confirm that the catalysts of Examples 1 and 2 have significantly reduced amounts of the deposited carbon. In particular, the catalyst of Example 2 has almost no amount of the deposited carbon.

Experimental Example 8

Evaluation for the Thermal Durability of the Catalyst (Sintering Phenomenon)

Figure 8:
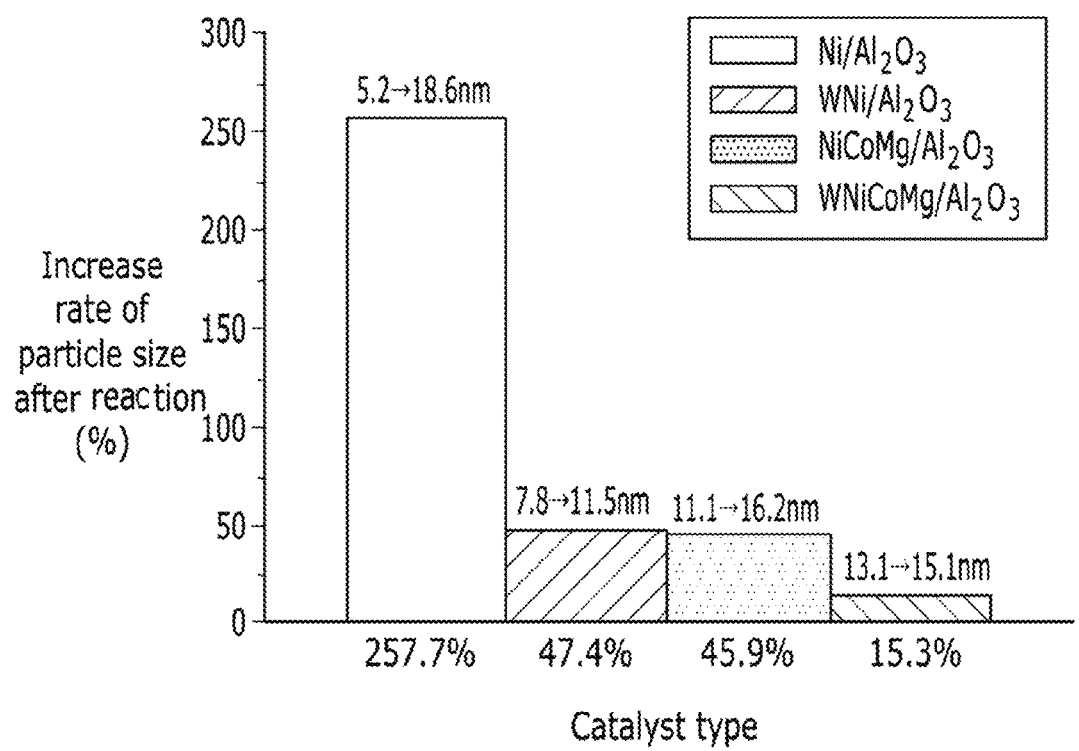
FIG. 8 is a graph showing the increasing rate of the particle size of the catalysts of Examples 1 and 2 and Comparative Examples 1 and 2 prior to and after being used in carbon dioxide reforming of methane.

Using each catalyst obtained from Examples 1 and 2 and Comparative Examples 1 and 2, the carbon dioxide reforming reaction of methane is conducted under the same conditions as Experimental Example 6. After the reaction, the particle size increase rate for each of the catalysts is measured with using a $H_2$ chemisorption analyzer (BEL-CAT). The results are shown in FIG. 8. The results of FIG. 8 confirm that the catalyst of Example 1 has a significantly smaller value of the particle size increase rate than that of Comparative Example 1. When being compared with that of Comparative Example 2, the catalyst of Example 2 exhibits a significantly decreased value of the particle size increase rate.

While this disclosure has been described in connection with various example embodiments, it is to be understood that the present disclosure is not limited to the disclosed embodiments, but, on the contrary, is intended to cover various modifications and equivalent arrangements included within the spirit and scope of the appended claims.

What is claimed is:

1. A catalyst for reforming hydrocarbons, comprising:
   an inorganic oxide;
   a catalyst metal supported on the inorganic oxide, at least a portion of the catalyst metal being supported in a form of a solid-solution particle, the catalyst metal including nickel, magnesium, and at least one first metal, the at least one first metal selected from cobalt, iron, copper, and manganese; and
   a plurality of particles supported on a surface of the solid-solution particle and spaced apart from each other, the plurality of particles including the inorganic oxide as a constituent material, the plurality of particles being in a form of islands of the inorganic oxide on the surface of the solid-solution particle.

2. The catalyst for reforming hydrocarbons of claim 1, wherein the solid-solution particle has an average size ranging from about 2 nm to about 20 nm.

3. The catalyst for reforming hydrocarbons of claim 1, wherein the magnesium is present in an amount of about 0.01 wt % to about 5 wt %, based on a total weight of the catalyst.

4. The catalyst for reforming hydrocarbons of claim 1, wherein the catalyst metal is supported in an amount of about 1 wt % to about 15 wt % based on a total weight of the catalyst.

5. The catalyst for reforming hydrocarbons of claim 1, wherein a weight ratio between the nickel and the at least one first metal ranges from about 1:20 to about 20:1.

6. The catalyst for reforming hydrocarbons of claim 1, wherein the inorganic oxide is at least one selected from an aluminum oxide, a titanium oxide, a cerium oxide, and a silicon oxide.

7. The catalyst for reforming hydrocarbons of claim 1, wherein the inorganic oxide has a specific surface area of about 20 to about 500 $m^2/g$.

8. The catalyst for reforming hydrocarbons of claim 1, wherein the catalyst is configured to exhibit a change in size of less than about 50% and a carbon deposition rate of less than about 0.1% upon contact with an input gas stream of $CH_4:CO_2:N_2=1:1:1$ at a temperature of about 700° C. to about 900° C. for up to about 200 hours.

9. A method of manufacturing a catalyst for reforming hydrocarbons, comprising:
providing an inorganic oxide;
dissolving a water-soluble salt of at least one first metal selected from cobalt, iron, copper, and manganese, a water-soluble salt of nickel, and a water-soluble salt of magnesium in water to provide an aqueous solution of metal salts;
mixing the aqueous solution of metal salts with the inorganic oxide to obtain a homogeneous slurry mixture;
drying the homogeneous slurry mixture to obtain a dried mixture; and
calcining the dried mixture to obtain the catalyst, the magnesium being present in an amount of about 0.01 wt % to about 5 wt % in the catalyst, the catalyst including a solid solution particle and a plurality of particles supported on a surface of the solid-solution particle and spaced apart from each other, the solid solution particle being of the at least one first metal, nickel, and magnesium, the solid solution particle being supported on the inorganic oxide, the plurality of particles including the inorganic oxide as a constituent material, the plurality of particles being in a form of islands of the inorganic oxide on the surface of the solid-solution particle.

10. The method of claim 9, wherein the calcining includes the catalyst having a weight ratio between nickel and the at least one first metal ranging from about 1:20 to about 20:1.

11. The method of claim 9, further comprising:
reducing the catalyst in at least one of a nitrogen atmosphere and a hydrogen atmosphere, wherein the reducing is carried out at a temperature of about 600° C. to about 900° C.

12. The method of claim 9, further comprising:
adding water to the catalyst and heat-treating in a hydrogen atmosphere, the heat-treating carried out at a temperature of 500° C. to about 900° C.

13. The method of claim 9, wherein the providing an inorganic oxide includes the inorganic oxide being at least one selected from an aluminum oxide, a titanium oxide, a cerium oxide, and a silicon oxide.

14. The method of claim 9, wherein the dissolving includes the water soluble salt of the at least one first metal, the water soluble salt of the nickel, and the water soluble salt of the magnesium being at least one selected from an acetate, a nitrate, a sulfate, an oxalate, a halide, a chloride, and a hydrate thereof.

15. The method of claim 9, wherein the calcining includes the at least one first metal, the nickel, and the magnesium being supported on the inorganic oxide in an amount of about 1 wt % to about 15 wt % based on a total amount of the catalyst.

16. A method of reforming hydrocarbons, comprising:
contacting an input gas stream with a catalyst, the input gas stream including a hydrocarbon and a reforming material, the catalyst including an inorganic oxide and a catalyst metal supported on the inorganic oxide, at least a portion of the catalyst metal being supported in a form of a solid-solution particle with a plurality of particles supported on a surface of the solid-solution particle and spaced apart from each other, the catalyst metal including nickel, magnesium, and at least one first metal selected from cobalt, iron, copper, and manganese, the plurality of particles including the inorganic oxide as a constituent material, and the plurality of particles being in a form of islands of the inorganic oxide on the surface of the solid-solution particle.

17. The method of claim 16, wherein the contacting includes the catalyst including magnesium in an amount of about 0.01 wt % to about 5 wt % based on a total weight of the catalyst, a weight ratio between nickel and the at least one first metal ranging from about 1:20 to 20:1.

* * * * *